Aug. 10, 1965    A. L. REHAK ETAL    3,199,296
GAS TURBINE ENGINE
Filed May 16, 1963    3 Sheets-Sheet 1
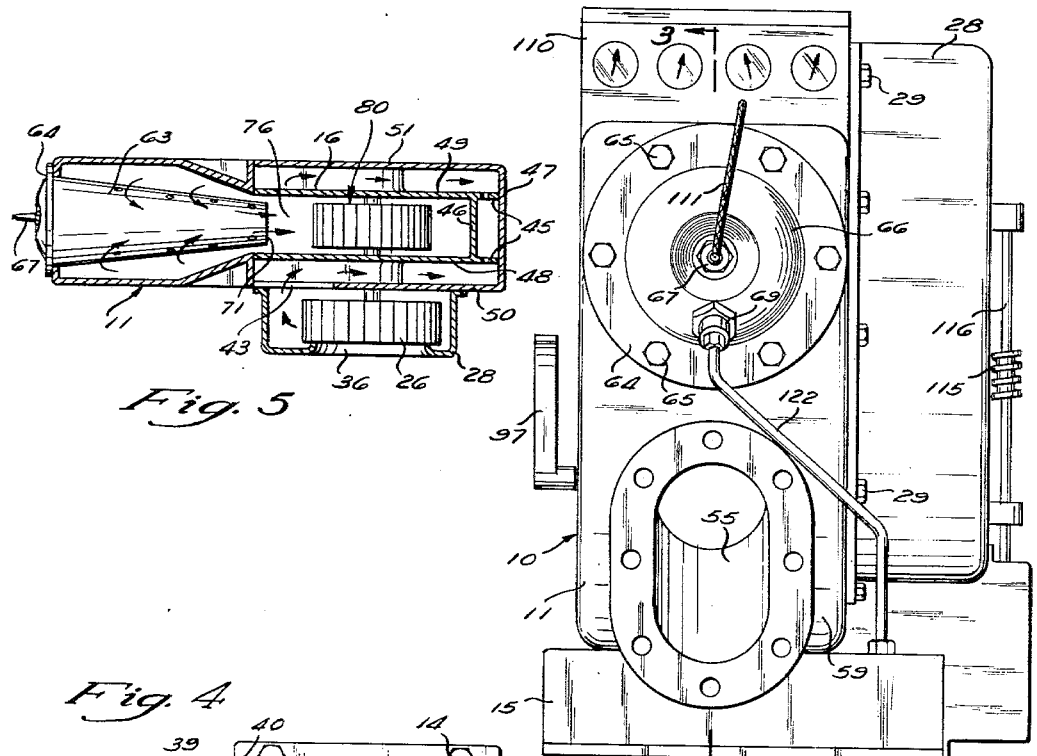
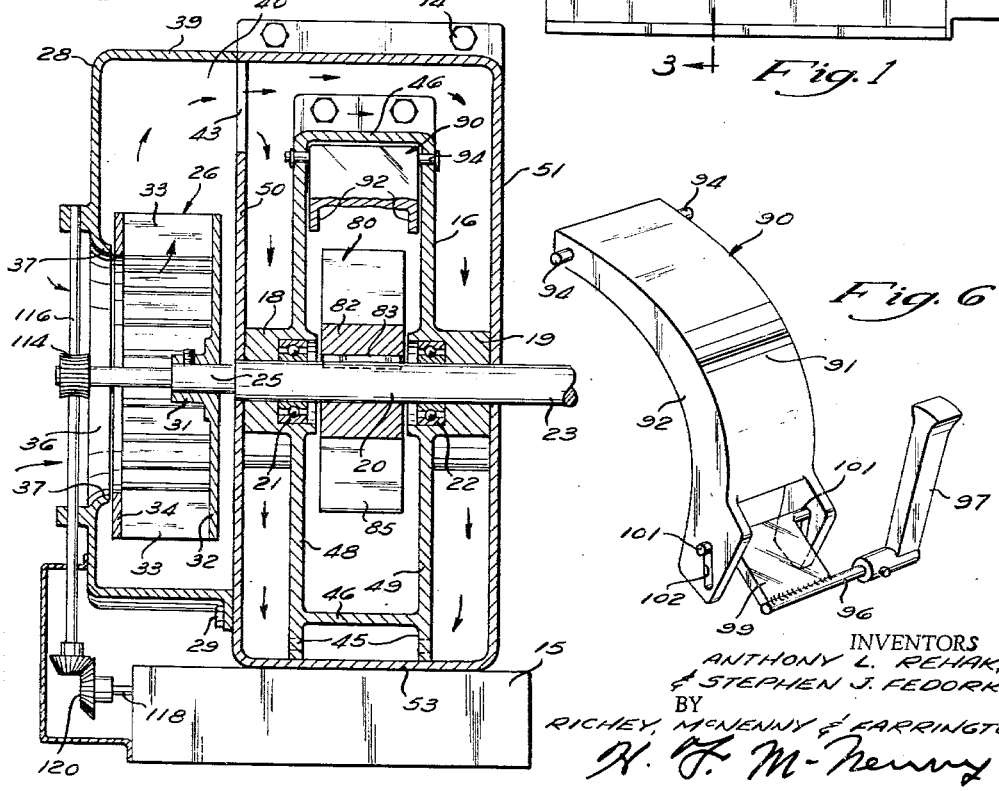
INVENTORS
ANTHONY L. REHAK,
& STEPHEN J. FEDORKO
BY
RICHEY, McNENNY & FARRINGTON
H. F. McNenny
ATTORNEYS

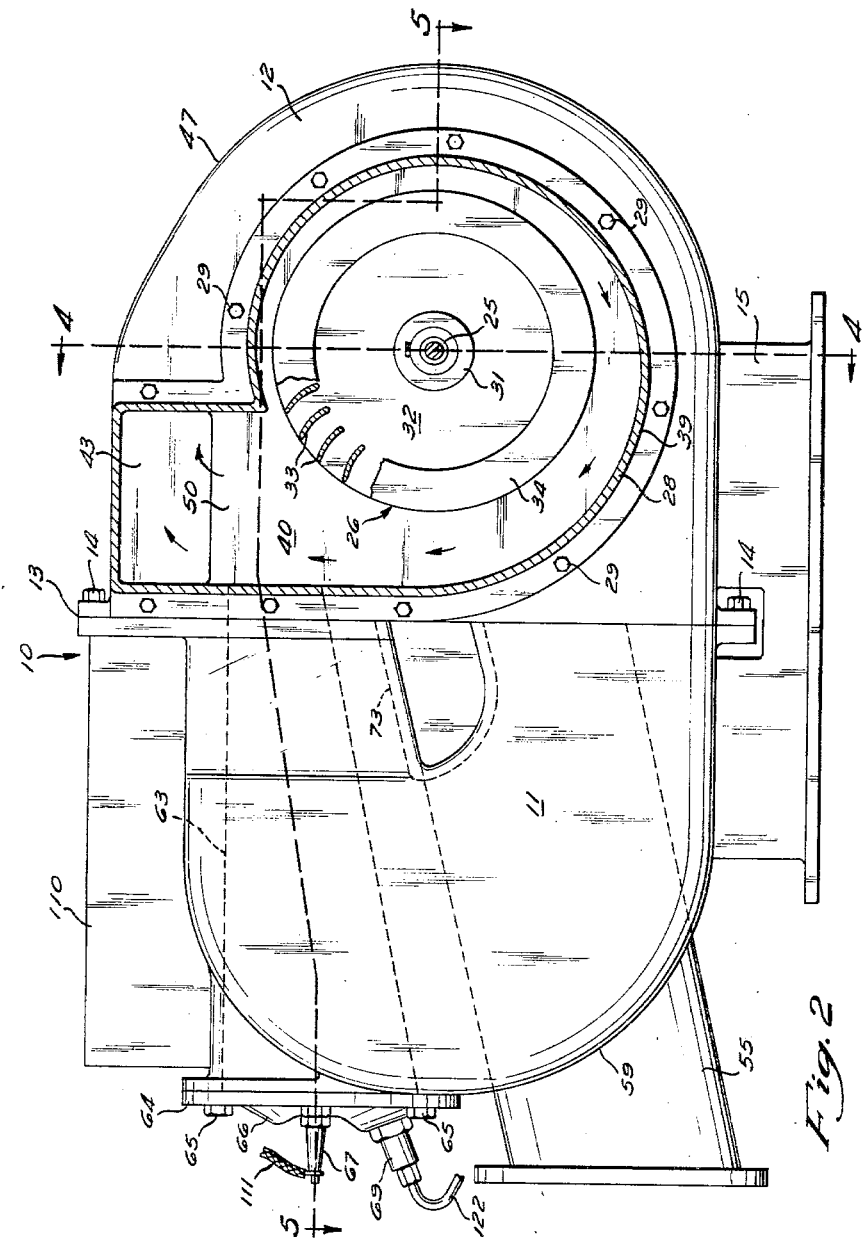

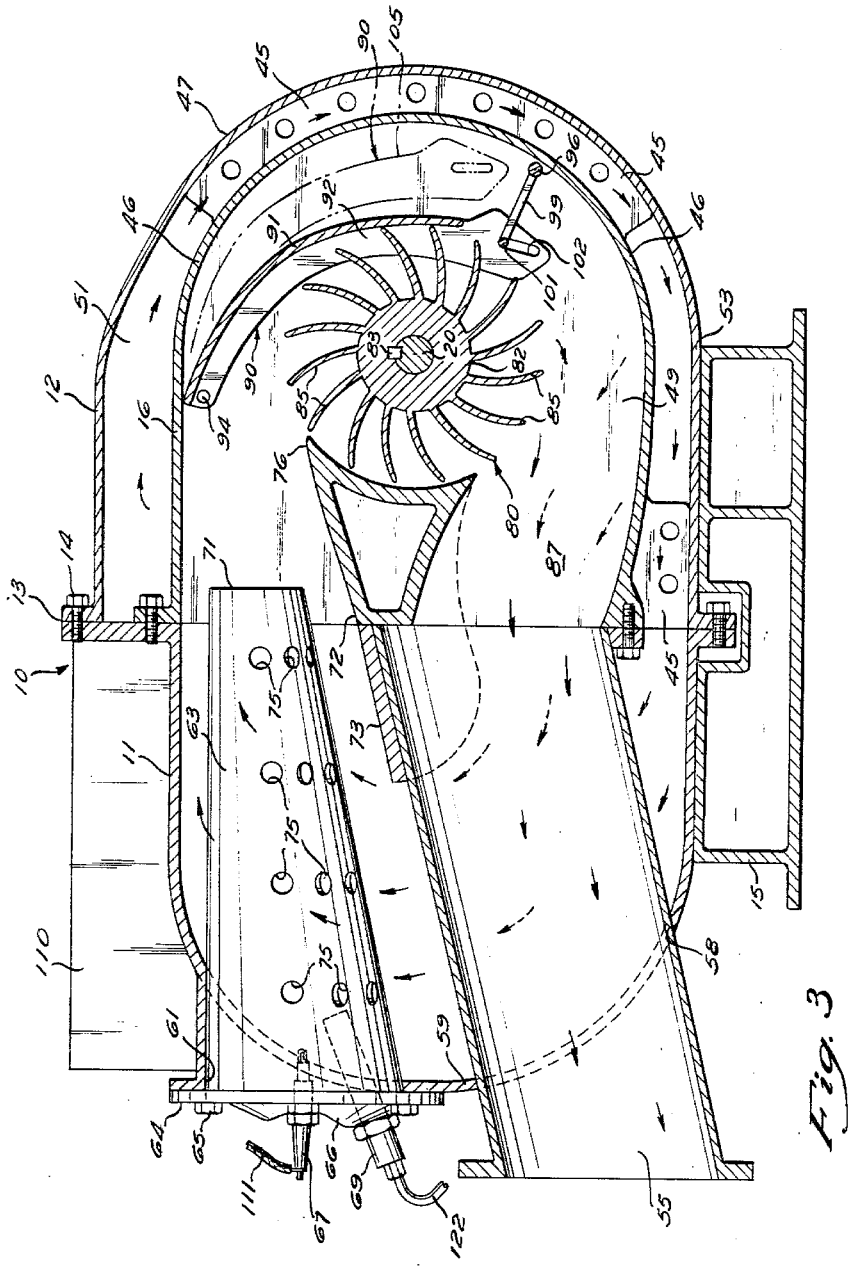

United States Patent Office 3,199,296
Patented Aug. 10, 1965

3,199,296
GAS TURBINE ENGINE
Anthony L. Rehak, 81 Kenneth Ave., Toronto, Ontario, Canada, and Stephen J. Fedorko, 10214 Sophia Ave., Cleveland, Ohio
Filed May 16, 1963, Ser. No. 280,921
4 Claims. (Cl. 60—39.75)

This invention relates generally to gas turbine engines and more particularly to gas turbine engines of the open cycle regenerative type.

The principal object of this invention is to provide a novel open cycle regenerative gas turbine engine in which the regenerative heat exchange action is provided by allowing the air from the compressor to flow around the turbine housing and exhaust duct before entering the combustion chamber area.

Another object of this invention is to provide a heat exchanger for a gas turbine engine as set forth in the preceding object which creates a minimum of turbulence in the gas flow while providing a relatively long flow path for maximum heating of the air entering the combustion chamber area.

Another object of this invention is to provide a gas turbine engine of minimum size using a novel arrangement of the compressor and turbine on a single axial shaft in which the principal direction of flow of the gases within the engine is along a curved path around the axis of the compressor and turbine to provide a relatively long flow path for heat exchange purposes with a minimum of travel along the axis of the shaft to allow a minimum size and volume for the engine.

Another object of this invention is to provide a novel regenerative gas turbine engine which allows efficient use of a turbine of the tangential flow impulse type.

Another object of this invention is to provide a novel gas turbine engine having an improved combustion chamber arrangement to give maximum velocity to the gases as they are directed to the turbine.

Another object of this invention is to provide a novel gas turbine engine in which the direction of flow of the gases to the turbine and the amount of energy imparted to the turbine by the gases may be controlled by a movable deflector arranged to allow a bypass of the gases from the combustion chamber around the turbine to permit rapid and effective control of the power output of the turbine in applications where a rapid and responsive control for varying the power output of the turbine is desired.

Still another object of this invention is to provide a novel open cycle gas turbine engine of the regenerative type which is of simple low cost construction to allow ease of manufacture and maintenance while providing high efficiency of operation.

Further objects and advantages of this invention will readily become apparent to those skilled in the art upon a more complete understanding of the preferred embodiment of the invention as shown in the accompanying drawings in which:

FIGURE 1 is an end elevational view of a gas turbine engine which incorporates the preferred embodiment of this invention;

FIGURE 2 is a side elevational view of the gas turbine engine of FIGURE 1 with parts broken away;

FIGURE 3 is a longitudinal cross-sectional view of the gas turbine engine taken on line 3—3 of FIGURE 1;

FIGURE 4 is a vertical cross-sectional view taken on line 4—4 of FIGURE 2;

FIGURE 5 is a reduced sectional view taken along line 5—5 of FIGURE 2; and

FIGURE 6 is a perspective view showing the control for moving the turbine deflector.

Referring now to the drawings in greater detail, the gas turbine engine includes a main housing 10 which comprises a front portion 11 and a rear portion 12 which are secured together at the flanged joint 13 by means of suitable fastening means such as cap screws 14. The housing 10 rests on top of a mounting base 15 on which the engine is supported.

As shown more clearly in FIGURES 3 and 4, a turbine housing 16 is mounted within the rear portion 12 of the main housing 10. It will be understood that many of the assembly details of the main housing 10 and the turbine housing 16 have not been shown, and it is recognized that for purposes of manufacture that these housings may be split longitudinally as along the viewing plane of FIGURE 3 if desired for purposes of ease of manufacture and assembly. Since such joints between the various pieces would be sealed and do not represent a particular feature of this invention, the completed turbine has been shown as assembled from a minimum number of pieces to allow greater simplicity and clarity in a description of the general arrangement and method of operation of the gas turbine engine.

The turbine housing 16 is provided with projecting bosses 18 and 19 on each side which extend transversely outward and may be secured to the sides of the rear portion 12 of the main housing. These bosses 18 and 19 are provided with suitable bores for receiving the main drive shaft 20 which is journaled in bearings 21 and 22 in the bosses 18 and 19. At its one end, a drive end 23 of the shaft 20 projects outward beyond the main housing for suitable connection by means of a coupling or reduction gear to the load or mechanism to be driven by the engine. Since the nature of the load or final drive of the engine forms no part of the present invention, it has not been shown in the drawings and will not be further described.

The main shaft 20 also has a second projecting portion 25 extending outward beyond the boss 18 for mounting the centrifugal compressor 26. The compressor 26 is mounted within a compressor housing 28 which is secured to the side of the rear housing portion 12 by suitable means such as screws 29. The centrifugal compressor 26 comprises a hub 31 secured to the shaft end 25 adjacent a rear housing portion 12. A flange 32 extends radially outward from hub 31 to receive one end of a plurality of radially extending vanes or blades 33 which are secured at the other end in a supporting ring 34. The end wall of the compressor housing 28 is provided with an opening 36 for admitting air to the compressor and an inturned flange 37 around the periphery of opening 36 extends adjacent the support ring 34 to provide a seal and prevent leakage of compressed air back out through the inlet opening 36. The compressor housing 28 is provided with a peripheral wall 39, which, as best shown in FIGURE 2, is formed with an increasing radius about the axis of shaft 20 leading to a collector portion 40 along the upper side of the rear housing portion 12 adjacent the flanged joint 13.

From the collector portion 40, compressed air passes through an opening 43 in the side wall of the rear housing portion 12 to enter the rear housing at the upper side of the turbine housing 16. As shown in FIGURES 2 and 3, the compressed air then travels around the turbine housing in the same direction of rotation as the shaft 20 and by passing over the heated turbine housing is heated prior to passing to the combustion chamber area. The flow of the air in this space is directed by means of suitable baffles 45 which permit some of the air to pass between the outer peripheral wall 46 of the turbine housing and the outer peripheral wall 47 of the rear housing portion 12. In addition, some of the air may also pass between the side walls 48 and 49 of the turbine housing and the side walls 50 and 51 of the rear housing portion 12. The flow of air around the bosses 18 and 19 aids in cooling the bearings 21 and 22 which are lubricated by forced circulations of oil in the usual manner.

As the compressed air continues its path around the turbine housing 16 it reaches the bottom wall 53 of the rear housing portion 12 adjacent the mounting base 15 and then passes into the front housing portion 11. At this point, the air is further heated by passing around the tubular exhaust duct 55 which extends from the lower end of the turbine housing 16 through a suitable opening 58 in the front wall 59 of the front housing portion 11. The front wall 59 of the front housing portion 11 is generally curved to deflect the heated air upward toward the combustion chamber which is located above the exhaust duct 55.

Above the exhaust duct opening 58, the front wall 59 of the front housing portion 11 is provided with a flanged opening 61 through which projects the conical combustion chamber member 63. The combustion chamber member 63 has a flange 64 at the rear end which is secured at the flanged opening 61 by suitable screws 65 to allow easy removal for cleaning and service and is closed off by means of a rear wall 66 which mounts a spark plug or igniting device 67 and the fuel injector nozzle 69. The combustion chamber member 63 extends rearwardly within the front housing portion 11, and while generally circular in cross-section, its walls taper to a projecting end 71 which extends adjacent the inlet opening 72 of the turbine housing 16.

The front housing member 11 is provided with a transverse baffle 73 above the exhaust duct 55 to insure that the heated compressed air entering the front housing portion 11 passes upward along the front wall 59 to come into contact with the combustion chamber 63 adjacent its rearward end. The combustion chamber 63 is provided with a plurality of openings 75 so that a portion of the heated air flowing upward from around the exhaust duct 55 passes into the interior of the combustion chamber where the fuel is injected and ignited and the combustion process starts. The burning gases then flow rearwardly within the combustion chamber 63 where as they increase in temperature the velocity increases to produce a high flow velocity at the turbine inlet 72. A portion of the air flows around the outside of the combustion chamber and then joins with the still burning gases at the combustion chamber tip 71 so that combustion is completed at the combustion chamber tip 71 at which point the gases have their highest temperature and therefore greatest velocity. At the turbine inlet 72, the turbine chamber walls form a reduced throat 76 to further increase the velocity of the gases as they are directed toward the turbine.

As shown more clearly in FIGURES 3 and 4, the turbine 80 is mounted on the main shaft 20 within the turbine housing 16 between the side walls 48 and 49. Turbine 80 is of the tangential flow impulse type and includes a hub 82 which is secured on the shaft 20 by means of a suitable key 83 and is provided with a plurality of generally radially extending vanes or blades 85 shaped to extract the maximum amount of work from hot gases entering the turbine chamber.

Because the hot gases entering the turbine chamber tend to follow the outer wall, a movable deflector 90 is provided to control the flow of gases against the turbine vanes 85. This deflector 90 is provided with a peripheral wall 91 generally curved to follow the outer edges of the vanes 85 and has side walls 92 adapted to extend radially inward along each side of the vanes 85 so as to effectively confine the gases entering the turbine chamber to strike against the vanes 85 before they can flow around to the exhaust area 87 below turbine 80. In order to allow shifting of the position of the deflector 90, it is pivotally mounted on pivot shaft 94 at the upper end of the turbine housing 16 so that its lower end may move radially toward and away from the vanes 85. To control the movement and position of the deflector 90, a rotatable control shaft 96 is journaled in the turbine housing 16 and has an end portion extending transversely outward through the turbine housing and through the rear housing portion 12 to mount an external control handle 97 for rotating the shaft 96. Within the turbine housing 16, the control shaft 96 has a radially projecting arm 99, at the outer end of which project a pair of fingers 101 which are received within slots 102 and the lower ends of the deflector side walls 92 as best seen in FIGURE 6. It will therefore be seen that, as shown in FIGURE 3, the deflector 90 may be moved from the maximum power position shown in solid lines in which all of the gases are required to strike the turbine vanes before flowing into the exhaust area 87 to the minimum power position as shown in phantom lines at 105 where the peripheral wall 91 of deflector 90 is spaced radially away from the outer tips of the turbine vanes 85 so that the hot gases will tend to flow along the deflector 90 to reach an exhaust area 87 without impinging upon the turbine vanes 85 and therefor imparting a minimum amount of work to the turbine.

As the exhaust gases leave the turbine, they flow downward into the exhaust area 87 in the lower portion of turbine housing 16 where they heat the walls of the turbine housing which in turn heats the compressed air flowing around the outer periphery of this housing. From the exhaust area 87, the gases then flow through the exhaust duct 55 and from there are exhausted to the atmosphere. It will be recognized that since the exhaust duct 55 is surrounded by the compressed air flowing toward the combustion chamber, this exhaust duct may be provided with suitable fins to provide increased area and more efficient heat exchange. Fins may also be provided on the lower portion of the turbine housing 16 to improve the heat exchange between the exhaust gases leaving the turbine and the compressed air prior to reaching the combustion area.

It is particularly pointed out that as the air and hot gases flow through the engine, from the time they pass through the opening 43 into the regenerative heat exchanging area surrounding the turbine housing 16 until they leave the exhaust duct 55 to the atmosphere, they undergo no sharp changes in direction. Since they are directed in a generally spiral path, first around the turbine housing 16, then around the exhaust duct 55, through and around the combustion chamber 63, through the turbine housing 16 in its interior, and then through the exhaust duct 55, maximum velocity of flow with a minimum turbulence and restrictions which would create energy losses and inefficiency is provided, while maintaining a generally compact arrangement for the engine within the main housing 10.

As shown in the figures, it is contemplated that the various electrical accessories may be mounted on top of the front housing portion 11 beneath the cover 110, and this is the preferred mounting for the ignition system which is connected by the spark plug wire 111 to the spark plug 67. As shown in FIGURES 1 and 4, the main shaft 20 may carry a worm gear 114 on its outer end outwardly of the air inlet opening 36 and the compressor housing 28 to provide an accessory drive. As shown, the worm gear 114 engages a mating gear 115 on the vertical accessory drive shaft 116. This accessory drive shaft 116 is shown in FIGURE 4 as driving the horizontal accessory shaft 118 located within the mounting base 15, by means of suitable miter gears 120. The shaft 118 may thus be used for driving the fuel pump and the necessary lubricant pumps for supplying oil to the bearings. The mounting base 15 may also contain the fuel tank and the fuel pump which supplies fuel through the fuel line 122 to the fuel injector 69.

If it is desired to provide more power without increasing the size of the turbine, several of the engines can be mounted side by side on a common shaft. In addition, it is possible to provide two combustion chambers directing gas to the same turbine by locating two turbine inlets 180° apart and scavenging the exhaust gases from each chamber within the 180° spacing between the inlets.

While the preferred embodiment of the invention has been shown in the drawings and described in the above detailed description, it is recognized that this embodiment and the particular details thereof have been shown as illustrative of the invention and various modifications and rearrangements may be resorted to as will suggest themselves to persons skilled in the art without departing from the scope of the invention defined in the following claims.

We claim:

1. A regenerative gas turbine engine comprising a generally cylindrical turbine housing having a circular outer peripheral wall and a pair of axially spaced end walls, a rotatable shaft extending axially through the end walls of said turbine housing, a turbine secured on said shaft within said turbine housing, bearing means rotatably journaling said shaft in said turbine housing, an outer housing around said turbine housing and having an axially extending circular peripheral wall spaced radially away from the outer wall of said turbine housing to define with a portion of said spaced end walls an annular space extending at least 180° around the periphery of said turbine housing, said outer housing having end walls spaced axially from the end walls of said turbine housing, a compressor housing on the outer side of one end wall of said outer housing around said shaft, an inlet opening in said compressor housing, a centrifugal compressor mounted on the end of said shaft within said compressor housing, passage means connecting said compressor housing with the interior of said outer housing to direct compressed air from said compressor into the annular space between said outer housing and said turbine housing to cause said air to flow circumferentially in a regenerative zone around the axis of said shaft in said annular space to provide regenerative zone around the axis of said shaft in said annular space to provide regenerative heat absorbing contact between said air and said turbine housing, said turbine housing having an inlet and an outlet, a combustion chamber mounted in said outer housing to receive heated air from said regenerative zone and extending toward said inlet of said turbine housing to define a combustion zone, said combustion chamber including fuel supply and ignition means for igniting said fuel in said air to produce heated gases, means to direct said heated gases into said turbine housing inlet to impinge upon the vanes of said turbine, and exhaust duct means to conduct exhaust gases from said turbine outlet to the exterior of said outer housing.

2. A regenerative gas turbine engine comprising a generally cylindrical turbine housing having a circular outer peripheral wall and a pair of axially spaced end walls, a rotatable shaft extending axially through the end walls of said turbine housing, a turbine secured on said shaft within said turbine housing, bearing means rotatably journaling said shaft in said turbine housing on each side of said turbine, an outer housing around said turbine housing and having an axially extending circular peripheral wall spaced radially away from the outer wall of said turbine housing to define with a portion of said spaced end walls an annular space extending at least 180° around the periphery of said turbine housing, said outer housing having end walls spaced axially from the end walls of said turbine housing, a compressor housing on the outer side of one end wall of said outer housing around said shaft, an inlet opening in said compressor housing, a centrifugal compressor mounted on the end of said shaft within said compressor housing, passage means connecting said compressor housing with the interior of said outer housing to direct compressed air from said compressor into the annular space between said outer housing and said turbine housing to cause said air to flow circumferentially in a regenerative zone around the axis of said shaft in said annular space to provide regenerative heat absorbing contact between said air and said turbine housing, said turbine housing having an inlet and an outlet, an exhaust duct connected to said outlet of said turbine housing and extending radially outward through said outer housing in the path of the air flowing in said regenerative zone around said turbine housing, a tapered perforated combustion chamber extending radially into said outer housing and toward said inlet of said turbine housing on the downstream side of said exhaust duct to define a combustion zone, said combustion chamber including fuel supply and ignition means for igniting said fuel in said air to produce heated gases, and means to direct said heated gases into said turbine housing inlet.

3. A regenerative gas turbine engine comprising a generally cylindrical turbine housing having a circular outer peripheral wall and a pair of axially spaced end walls, a rotatable shaft extending axially through the end walls of said turbine housing, a tangential flow impulse type turbine secured on said shaft within said turbine housing, bearing means rotatably journaling said shaft in said turbine housing on each side of said turbine, an outer housing around said turbine housing and having an axially extending circular peripheral wall spaced radially away from the outer wall of said turbine housing to define with a portion of said spaced end walls an annular space extending at least 180° around the periphery of said turbine housing, said outer housing having end walls spaced axially from the end walls of said turbine housing, a compressor housing on the outer side of one end wall of said outer housing around said shaft, an inlet opening in said compressor housing, a centrifugal compressor mounted on the end of said shaft within said compressor housing, passage means connecting said compressor housing with the interior of said outer housing to direct compressed air from said compressor into the annular space between said outer housing and said turbine housing to cause said air to flow circumferentially in a regenerative zone around the axis of said shaft in said annular space to provide regenerative heat absorbing contact between said air and said turbine housing, said turbine housing having an inlet and an outlet, an exhaust duct connected to said outlet of said turbine housing and extending radially outward through said outer housing in the path of the air flowing in said regenerative zone around said turbine housing, a conical perforated combustion chamber extending radially into said outer housing and toward said inlet of said turbine housing on the downstream side of said exhauset duct to define a combustion zone, said combustion chamber including fuel supply and ignition means for igniting said fuel in said air to produce heated gases, means to direct said heated gases into said turbine housing inlet to impinge upon the vanes of said turbine, a selectively adjustable deflector mounted within said turbine housing to control the flow of said heated gases around said turbine, said deflector being pivotally mounted at one end on said turbine housing, said deflector having walls defining a channel arranged to extend adjacent the edges of said vanes on said turbine, the other end of said deflector being movable radially to and from said turbine, and control means to adjust position of said deflector within said turbine housing.

4. A regenerative gas turbine engine as set forth in claim 3 wherein said control means includes a control shaft journaled in said turbine housing parallel to said rotatable shaft and extending outward through said outer housing, an arm on said control shaft within said turbine housing, and means connecting said arm to said deflector at the end away from said pivot mounting whereby rotation of said control arm shifts the deflector to and from said turbine.

References Cited by the Examiner

UNITED STATES PATENTS

| | | | |
|---|---|---|---|
| 201,875 | 4/78 | Estey | 253—136 |
| 1,702,264 | 2/29 | Lorenzen | 60—39.51 |
| 2,370,217 | 2/45 | Wright | 60—39.75 |
| 2,589,239 | 3/52 | Fallon | 60—39.75 |
| 2,851,859 | 5/58 | Foure | 60—39.65 |
| 2,958,506 | 11/60 | Chimento | 253—52 |
| 3,057,157 | 10/62 | Close | 60—39.51 |

FOREIGN PATENTS

| | | |
|---|---|---|
| 388,546 | 6/08 | France. |
| 438,590 | 12/26 | Germany. |
| 297,442 | 6/32 | Italy. |

SAMUEL LEVINE, *Primary Examiner.*